Feb. 21, 1967 KUZUO ISHINO 3,305,106
METHOD AND APPARATUS FOR LOADING AND UNLOADING SHIPS
Filed Feb. 9, 1965 3 Sheets-Sheet 1

INVENTOR.
KUZUO ISHINO, DECEASED
BY HISAKO ISHINO, HEIRESS

BY McHew and Toren
ATTORNEYS

INVENTOR.
KUZUO ISHINO, DECEASED
BY HISAKO ISHINO, HEIRESS

BY McHew and Toren
ATTORNEYS

INVENTOR.
KUZUO ISHINO, DECEASED
BY HISAKO ISHINO, HEIRESS

BY McGlew and Toren
ATTORNEYS

United States Patent Office 3,305,106
Patented Feb. 21, 1967

3,305,106
METHOD AND APPARATUS FOR LOADING
AND UNLOADING SHIPS
Kuzuo Ishino, deceased, late of Tokyo, Japan, by Hisako
Ishino, heiress, Tokyo, Japan, assignor to Mitsubishi
Jukogyo Kabushiki Kaisha, Tokyo, Japan
Filed Feb. 9, 1965, Ser. No. 431,475
Claims priority, application Japan, Feb. 17, 1964,
39/8,317
29 Claims. (Cl. 214—14)

This invention relates to the handling of dry cargo in bulk carriers, and, more particularly, to a novel method of and apparatus for hydraulically loading and/or unloading dry cargo carried by bulk carriers of the double bottom type and to a novel bulk carrier of dry cargo.

Conventional bulk carriers or dry cargo, such as crushed or broken ores, coal, etc., are constructed with double bottoms as, otherwise, the center of gravity of the carrier would be too low in the loaded condition, as is well known to those skilled in the art. Furthermore, the inner plates of the double bottom can be damaged easily due to the impact falling cargo discharged from a crane bucket or the like during loading. Conversely, during unloading, the bulk cargo is discharged through cargo hatchways, as by means of bucket cranes at a quay or pier, from which the unloaded cargo is conveyed to a storage yard or the like, usually by means of a bulk conveyor. In order to obtain an unhindered passage of the crane bucket through the cargo hatchway, the hatchways on the upper deck, are designed so as to have lateral dimensions approximately the same as those of the bottom of a hold.

In view of these relatively large hatchway openings in the upper deck of the carrier, extra heavy and extra thick steel plates have to be used for the sides and bottom of the carrier in order to provide sufficient strength, longitudinally of the carrier, to resist the strains and stresses due to hogging and sagging of the carrier. Furthermore, the upper plates of the double bottom must be made extra strong and thick in order to resist adequately impacts due to striking of the crane buckets on the upper plates.

In addition, recently constructed carriers have a much higher tonnage and a much greater length, and this has required that the mooring quays be not only lengthened, but also have the water alongside the same dredged to a deeper depth. In order to make most efficient use of these newer large carriers, the unloading equipment on the quays must be correspondingly greatly enlarged, and this results in a more complicated mechanism for the unloading equipment, with both the size and the additional complications greatly increasing the cost of the loading and unloading mechanism.

Accordingly, an object of the present invention is to provide a novel method of hydraulically loading and/or unloading bulk carriers of dry cargo.

Another object of the invention is to provide a novel apparatus for hydraulically loading and/or unloading bulk carriers of dry cargo.

A further object of the invention is to provide novel apparatus for hydraulically loading and/or unloading bulk carriers of dry cargo, including hydraulic lines on the carrier communicable with the holds thereof and hydraulic fluid supply and return lines on the shore having coupling means for connection to the hydraulic line on the carrier when the latter is moored at a quay or dock.

Yet another object of the invention is to provide apparatus for hydraulically loading and/or unloading bulk carriers of dry cargo, including a hydraulic fluid line, means for supplying a conveying fluid to the line, and means for continuously feeding bulk cargo to the line for conveying therealong by the conveying fluid.

Still another object of the invention is to provide a bulk carrier of dry cargo characterized by the lack of cargo hatchways opening into the holds and by the provision of a cargo pipe line communicable with the holds and having a conveying medium circulated therethrough to convey dry cargo, discharged into the cargo conveying pipe line, in either a loading or unloading direction, with the conveying fluid medium being supplied, under pressure, from a source outside the carrier.

In accordance with the invention, a bulk carrier is provided with holds for receiving bulk dry cargo, such as ores, coal, etc., and with a cargo piping system through which a conveying fluid medium is circulated during loading and/or unloading of the carrier. The bulk carrier is further provided with means for continuously feeding bulk cargo to the cargo piping system, and with means for connecting the cargo piping system to conveying fluid medium supply and return lines on the shore side and connected to a source of conveying fluid medium provided with fluid medium circulating means. At the source of conveying fluid medium, filter or separating means are provided whereby the cargo conveyed along the return line on the shore side may be separated from the conveying fluid, with the latter being returned to the sump or other fluid medium storage means. The separated dry cargo may then be transported to a storage yard or the like by suitable means such as an endless belt conveyor or the like.

For an understanding of the principles of the invention, reference is made to the following description of typical embodiments thereof as illustrated in the accompanying drawings.

Figure 1:
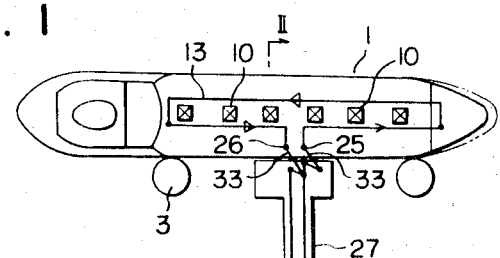
FIG. 1 is a plan view of a moored bulk carrier and one embodiment of hydraulic means for unloading dry cargo from the carrier.
Figure 3:
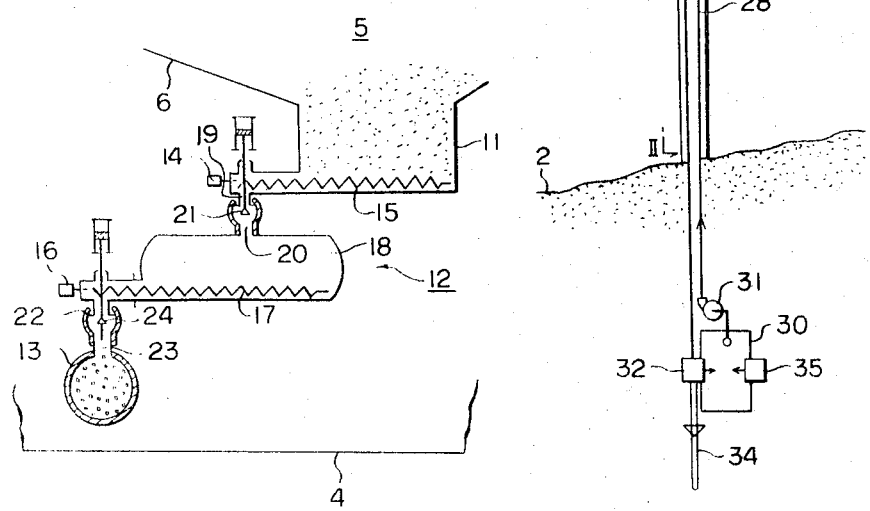
FIG. 3 is a partly schematic partial transverse sectional view of the carrier illustrating details of the cargo discharging apparatus shown in FIG. 2.
Figure 2:
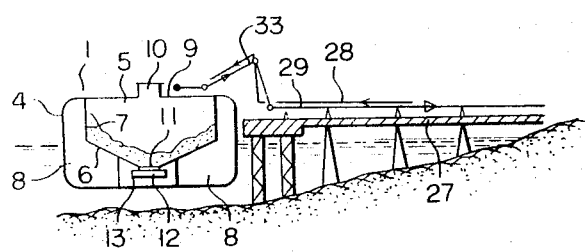
FIG. 2 is a vertical sectional view taken along the line II–II of FIG. 1.

In the embodiment of the invention shown in FIGS. 1, 2 and 3, loading of an ore carrier is effected by means of conventional loaders, while the unloading of an ore carrier is effected hydraulically with the cargo handling arrangement of the invention. As illustrated, bulk dry cargo carrier 1 is moored at dolphins 3 located at some distance from the shore line 2. The hull 4 of the carrier 1 has a double bottom construction providing the holds 5. The inner wall of the hull bottom, shown at 6, is funnel-shaped or hopper-shaped, and has a theoretical apex extending along the center vertical longitudinal plane of hold 5. A ballast water hold 8 is formed by hull 4 and side walls 7, the ballast water hold 8 laterally enclosing the cargo holds 5.

Bulk carrier 1 has an upper deck 9 and a plurality of cargo hatchways 10 are provided in spaced relation along deck 9, hatchways 10 being spaced apart along a line connecting the bow and the stern. Each of the hatchways 10 can be of small size, as the hatchways are used only during loading of dry cargo into holds 5.

The hopper-shaped bottom wall 6 of each hold 5 is provided with a discharge opening 11 centrally of the cargo hold, these openings 11 being spaced along the centerline of the carrier 1, and each opening being at the lower end of a bottom wall 6. A cargo discharging apparatus 12 is located between the two walls of the double bottom of carrier 1, and includes a single cargo conveying pipe line 13 extending longitudinally of discharge openings and the bottom wall of hull 4.

As shown more particularly in detail in FIG. 3, the ore discharge apparatus 12 includes an upper cargo feeder 15 which may be, for example, a screw conveyor driven by a motor 14 and extending across discharge opening 11. A lower cargo feeder 17, which may also be a screw-type conveyor driven by a motor 16, extends longitudinally of a receiving tank 18 and is positioned beneath the upper feeder 15. Upper feeder 15 moves the dry cargo to an outlet 19 communicating, with an inlet 20 of tank 18, through a hydraulically operated valve 21. Similarly, lower feeder 17 delivers dry cargo from tank 18 to an outlet 22 communicating, with an inlet 23 of pipe 13, through the medium of a hydraulically operated valve 24.

The cargo conveying or loading pipe 13, as best seen in FIG. 1, extends adjacent all of the holds 5 and is in the general form of an open loop having its ends extended through deck 9. Both ends of pipe 13 are substantially midway of the length of carrier 1, and one end is arranged to have delivered thereto a fluid conveying medium while the other end 26 is arranged to discharge the dry cargo entrained in the fluid conveying medium.

The short side installation includes a fluid medium supply line 28 and a cargo carrying return line 29 which extend, in substantially parallel relation, along a pier or quay 27 at which carrier 1 is docked by being moored to dolphins 3. Fluid medium supply line or pipe 28 is connected, at one end, to a fluid medium reservoir 30 located shoreside. The other end of pipe line 28 is connected, through a suitable coupling, with the receiving end 25 of pipe 13. Fluid medium from reservoir 30 is supplied to pipe 38 through a pump 31. Return line or pipe 29 is connected, through a suitable coupling, to discharge end 26 of piping system 13. The other end of pipe 29 is connected to reservoir 30 through a filter or separator 32. Suitable articulated connection means or couplings 33 are provided to connect pipe 28 to end 25 of pipe 13 and to connect pipe 29 to end 26 of pipe 13. A suitable conveying means, such as a bulk conveyor 34, extends from filter 32 to a bulk cargo storage yard, such as an ore or coal stock pile. Regulating means 35, for the fluid conveying medium, is mounted on reservoir 30.

In order to unload ores or the like from holds 5 by hydraulic means, the ores must be treated, as by crushing, so as to be agglomerated or granulated, or else must be agglomerated into suitable pellets by sintering.

Any clogging due to sedimentation of granulated ores in the hydraulic lines does not depend on the mean grain size of the ores but rather on the largest grain size present. Consequently, the diameter of the cargo conveying pipe lines and the rate of flow of the conveying medium are determined on the basis of the largest grain size. If the grain size distribution has too wide a range, the installation or power cost will be unnecessarily increased. Consequently, it is preferable to select the largest grain size by sieving, so as to obtain a relatively narrow range of grain sizes.

It is not desirable to use sea water as a conveying medium, because the specific gravity of sea water is lower than that of the dry cargo. Furthermore, ore refining processes are adversely affected by salt sticking to the ore if it is conveyed in sea water. Desirably, the fluid conveying medium comprises a relatively heavy liquid preferably constituted by fresh water having particles of magnetite suspended therein. In unloading carrier 1, as shown in FIGS. 1, 2 and 3, the conveying liquid in the reservoir 30 is supplied under pressure through feed pipe 28 to pipe line 13 by means of the pump 31. After flowing at high pressure and at high velocity through pipe 13, the heavy liquid conveying medium is returned through the reservoir through the cargo return line or pipe 29.

When hydraulically operated valve 21 is opened, upper feeder 15 is activated. The cargo in hold 5 moves downwardly along the inclined surfaces of the bottom plates 6 and is gradually moved to discharge opening 11 at the center of the bottom of hold 5. The cargo is then fed by feeder 15 to valve 21, and, through outlet 19, valve 21 and inlet 20, into receiving tank 18 which is thus charged with the dry cargo, such as ore or coal. When tank 18 is nearly filled with cargo, upper feeder 15 is deactivated and valve 21 is closed. At the same time, hydraulically operated valve 24 is opened and lower feeder 17 is activated. The cargo in tank 18 is then forced toward outlet 22 and through valve 24 and inlet 23 into the unloading pipe line 13.

It will thus be seen that the cargo in hold 5 is discharged initially to receiving tank 18, which, at that time, is disconnected from pipe 13 by closing the valve 24. Then the cargo in tank 18 is fed to pipe 13, while tank 18 is disconnected from hold 5 by closing valve 21. Thus, there is at no time a direct connection between discharge opening 11 of hold 5 and unloading pipe 13. This avoids the possibility that the heavy liquid, flowing at high pressure and high velocity through pipe 13, may enter hold 5.

Since the feeding of ores through pipe 13 is performed intermittently by means of the discharging apparatus 12, it is necessary to provide a plurality of such apparatuses in order to assure continuous feeding of cargo to pipe 13. For this purpose, the relative time lag in the operation of each apparatus 12 is so selected that, at all times, at least one apparatus 12 is conditioned for feeding ores to unloading pipe 13. Therefore, and considering the overall system, there is a continuous feeding of cargo to pipe line 13.

The cargo, such as ore, discharged into pipe 13, is continuously carried away through this pipe, as indicated by the arrow shown in FIG. 1, and is transported through the cargo carrying pipe line 29. Filter 32, at the end of line 29, separates the cargo, such as ore or coal, from the heavy liquid conveying medium, and the cargo is carried to the storage yard by means of bulk conveyor 34. The heavy conveying liquid, from which the cargo has been separated by means of filter 32, is returned to reservoir 30 and pumped out again by pump 31 for re-circulation through supply line 28 and pipe line 13.

In order to maintain the density and concentration of the conveying liquid at selected values, samples of the liquid are withdrawn, at uniform time intervals, by regulating apparatus 35 associated with two electrodes arranged at a fixed distance from each other, with one of these electrodes emitting gamma rays, while the other electrode serves to obtain a measurement of the degree of damping of the gamma rays by passage through the liquid conveying medium. Thereby, the density or concentration of the heavy conveying liquid can be determined and, after such determination, additional feed of either fresh water or magnetite powder may be provided for reservoir 30. This heavy liquid in the reservoir has to be subjected to continuous agitation in order to prevent sedimentation. However, once having entered feed pipe 28, the heavy liquid flows uniformly because the powders in the liquid are too small a size to settle out on the bottom of pipe 28. Due to the mutual attraction between the powder particles, the resistance to the shearing strains of the fresh water as the suspension liquid is enhanced. Thereby, the same effect is obtained as with a clear solution of a high specific gravity.

Figure 4:
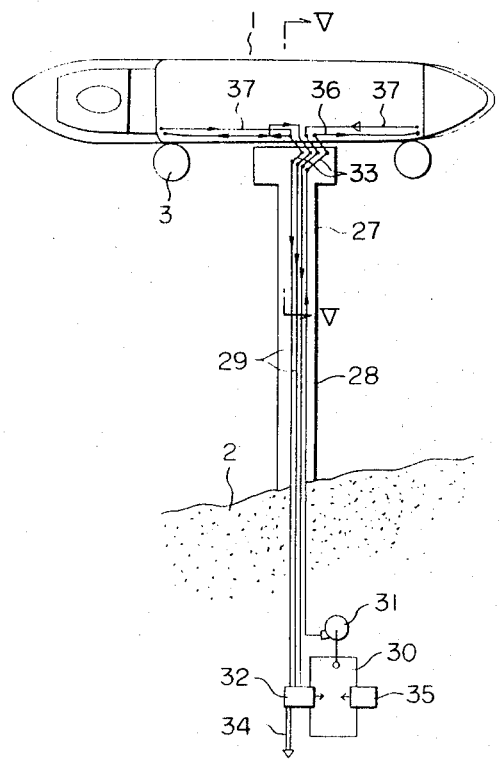
FIG. 4 is a plan view, similar to FIG. 1, illustrating another embodiment of the invention for loading and/or unloading dry cargo by hydraulic means.
Figure 5:
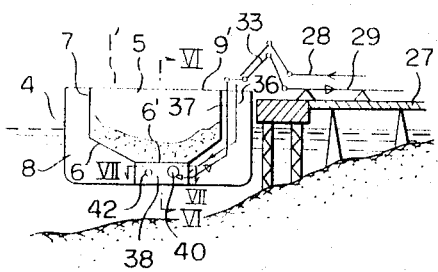
FIG. 5 is a vertical sectional view taken along the line V–V of FIG. 4.
Figure 6:
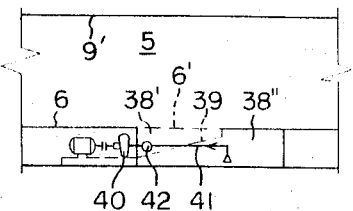
FIG. 6 is a vertical sectional view taken along the line VI–VI of FIG. 5.
Figure 7:
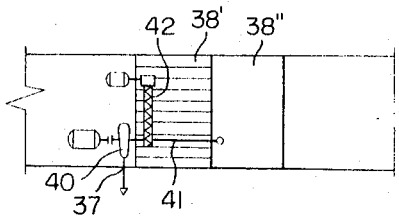
FIG. 7 is a horizontal sectional view taken along the line VII–VII of FIG. 5.

FIGS. 4 through 9 illustrate an embodiment of the invention in which the cargo is both loaded and unloaded hydraulically. Thus, in the arrangement of FIGS. 4 through 9, no conventional loader is needed, as is the case in connection with the embodiment of the invention shown in FIGS. 1, 2 and 3, and no cargo hatchways are provided on deck 9' of carrier 1'. A feed pipe 36 for the fluid conveying medium is arranged inside bulk carrier 1' and is used for loading, while a cargo conveying pipe or line 37, also arranged inside bulk carrier 1', is used for unloading. A plurality of tanks 38, for receiving the fluid conveying medium, are positioned longitudinally along the space between bottom plating 6 and the bottom of hull 4, and are arranged to communicate with pipes 36 and 37. Each tank 38 is divided into an upper part 38' and a lower part 38'' by an inclined plate 39 having slits, as best seen in FIGS. 6 and 7. The portion 6' of plating 6 which covers the upper part 38' is also formed with slits. The slits of plate 39 are so designed that the fluid conveying medium can pass therethrough but the dry cargo, such as ore, cannot pass therethrough, so that the width of the slits depends upon the grain size of the ore or other dry cargo. As a result of this construction, lower part 38'' does not receive any ore or other dry cargo but only receives the conveying medium.

A conveying medium suction pipe 41 is provided in lower part 38'' and extends through upper part 38'. Pipe 41 is connected with cargo conveying pipe 37 through the medium of a pump 40. The shaft of the rotary feeder, 42, for displacing the ore, or other dry cargo, extends transversely along the lower portion of the upper part 38' and has its discharge end connected with suction pipe 41.

During unloading of cargo, the heavy conveying liquid in reservoir 30 is fed, by means of a pump 31, to each receiving tank 38 through the medium of a shoreside feed line 28 and the feed pipe 36 inside the carrier, as shown in FIG. 4. The rate of supply of the conveying fluid is automatically adjusted so as to maintain a constant level of fluid in reservoir 30. When pump 40 and mechanical feeder 42 are activated, the conveying liquid in lower part 38'' of a tank 38 is sucked through pipe 41. The ore or other dry cargo falling into the heavy liquid in the upper part 38' through the slit plating 6', and moving along the inclined slit plate 39 to gather at the lower end thereof, is fed at a constant rate to suction pipe 41 by operation of feeder 42. The heavy liquid, thus having a uniform concentration of ores or other dry cargo entrained therein, is pumped out by means of pump 40 and delivered to shoreside feed line 29 through cargo conveying pipe 37 in carrier 1', as shown in FIGS. 4 and 5. The ore or other dry cargo is separated from the conveying liquid by means of the filter 32.

In the example just illustrated, the heavy conveying liquid, with the ore entrained therein, is pumped out only by pump 40 attached to tank 38 and without the assistance of shore-based pump 31. In addition, the number of cargo conveying pipes 37 and 39 corresponds to the number of receiving tanks 38. Thereby, a continuous unloading through the several lines can be effected, as shown in FIG. 4.

Figure 8:
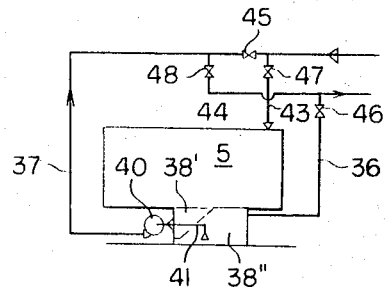
FIG. 8 is a schematic piping diagram illustrating the hydraulic loading of dry cargo into the carrier shown in FIG. 4.

For an understanding of the procedure of loading the cargo, reference is made to FIG. 8. In FIG. 8, branch pipes 43 are branched from cargo conveying pipe 37, at points within carrier 1', as on deck 9', and are connected to respective cargo holds 5. Similarly, a connecting pipe 44 is provided between cargo conveying pipe 37 and feed pipe 36, and respective valves 45–48 are provided in the respective pipes, all as shown in FIG. 8.

For loading, a dry cargo feeding conveyor, resembling feeder 42, is provided at the shoreside loading site, for delivering cargo to the conveying fluid, with the cargo suspended in the conveying fluid, being delivered to conveying pipe 37. On carrier 1, valves 45 and 46 are closed, and valves 47 and 48 are opened. Thereby, the conveying liquid, with the cargo suspended therein, flows down into the respective cargo holds 5 through the respective branch pipes 43 and passes through slit plating 6' and into the upper part 38' of tank 38. The slits of inclined plate 39 prevent the cargo from passing therethrough, so that only the conveying liquid enters the lower part 38'' through the slits in plate 39. Thus, if feeder 42 is disconnected from suction pipe 41, and if pump 40 is driven, the conveying liquid is pumped into conveying pipe 37, diverted to branch pipe 44, and returned to the shore through feed pipe 36.

It is a prerequisite that the pieces of ore or other bulk dry cargo have a substantial size so that the conveying liquid may pass through the gaps between the pieces of cargo. When the cargo used for loading carrier 1 has grain sizes such as do not permit the liquid to pass therethrough, means by which liquid, remaining on the layer of deposited ores or other dry cargo, may be shifted into the receiving tank, preferably is provided. An example of such an arrangement is shown in FIG. 9.

Figure 9:
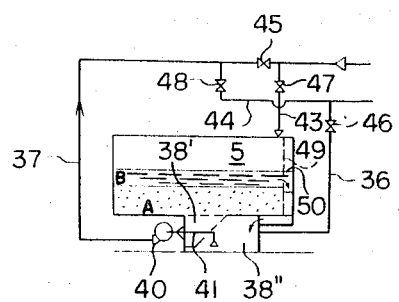
FIG. 9 is a piping diagram illustrating another embodiment of the hydraulic loading and/or unloading means for the carrier shown in FIG. 4.

Referring to FIG. 9, a slit plate 49 is provided near one side wall of each hold 5. A trunk 50, between plate 49 and the hold side wall, is connected with the lower part 38'' of receiving tank 38 in such a manner that the liquid layer B resting on top of the layer A of deposited cargo, passes through the slits of plate 49 to flow into lower part 38'' of tank 38 from which it may be easily returned to the shore site.

As will be clear from the foregoing description, with the arrangement of the invention bulk carrier 1' is loaded and unloaded by using a conveying fluid medium which is provided and stored on the shore and is continuously fed for circulation during loading and unloading of the conveyor. However, the carrier, while transporting the cargo, is loaded only with bulk cargo. In the case of the first embodiment, shown in FIGS. 1, 2 and 3, and where the loading is performed by a conventional loader while the unloading is performed hydraulically, the cargo hatchways on the upper deck 9 are so small in size that only loading may be performed therethrough. In the case of the second embodiment, shown in FIGS. 4 through 9, and where both loading and unloading are performed hydraulically, no cargo hatchways are provided. Consequently, thinner plates can be used for the upper deck without reducing the requisite strength of the hull, thereby reducing the construction cost of the hull. On the other hand, it is not necessary to provide a long quay or pier in deep water alongside the cargo storage yard, but only dolphins, for mooring the carrier, and shoreside piping connections, which are positioned far from the ore storage yard, are required in order to have enough depth of water to accommodate the draft of ships to be loaded and unloaded. Consequently, the high cost of quay installations alongside of a storage yard are reduced.

The need of deep water and a long quay for large size bulk carriers can be met, using the arrangement of the invention, without difficulty. The cargo handling, particularly during unloading, does not require the use of a bucket crane. Consequently, unloading is continuously and efficiently performed without the chance of a falling bucket striking the bottom wall of a hold. It thus will be apparent that the provision of the bulk carrier and the cargo-handling arrangement of the invention makes possible continuous and unfailing performance of cargo-handling and reduces the construction costs of the bulk carrier as well as the cost of cargo handling arrangements.

While specific embodiments of the invention have been shown and described in detail to illustrate the application of the principles of the invention, it will be understood that the invention may be embodied otherwise without departing from such principles.

What is claimed is:

1. A cargo handling arrangement for double bottom bulk carriers of dry cargo such as ores, coal, etc., comprising, in combination, pipe line means on the carrier within the double bottom thereof and in communication with the cargo holds thereof; shore based means, including a source of relatively heavy conveying liquid, comprising fresh water having fine particles of magnetite and the like suspended therein, and separating means, operable to circulate the relatively heavy conveying liquid through said pipe line means when said carrier is at anchorage; and conveyor means operable to continuously discharge dry cargo from holds of said carrier into said pipe line means for entrainment in the conveying liquid for conveyance to, and separation at, said shore based means.

2. A cargo handling arrangement, for double bottom bulk carriers of dry cargo, such as ores, coal, etc., comprising, in combination, pipe line means on the carrier within the double bottom in communication with the cargo holds thereof and having terminals accessible from the exterior of the carrier; a shore based reservoir of relatively heavy conveying liquid, comprising fresh water having fine particles of magnetite and the like suspended therein; a liquid supply line and a liquid return line communicating with said reservoir and having terminals at a carrier anchorage; cargo separating means in said return line in advance of said reservoir; disengageable coupling means operable to couple said supply and return line terminals to respective terminals of said pipe line means, when the carrier is at said anchorage, to circulate the conveying liquid through said pipe line means; and conveyor means operable to continuously feed dry cargo from cargo holds of said carrier to said pipe line means for entrainment in the conveying liquid for delivery to, and separation at, said shore based reservoir.

3. A cargo handling arrangement, for double bottom bulk carriers of dry cargo, such as ores, coal, etc., comprising, in combination, pipe line means on the carrier within the double bottom in communication with the cargo holds thereof and having terminals accessible from the exterior of the carrier; a shore based reservoir of relatively heavy conveying liquid, comprising fresh water having fine particles of magnetite and the like suspended therein; a liquid supply line and a liquid return line communicating with said reservoir and having terminals at a carrier anchorage; cargo separating means in said return line in advance of said reservoir; disengageable coupling means operable to couple said supply and return line terminals to respective terminals of said pipe line means, when the carrier is at said anchorage, to circulate the conveying liquid through said pipe line means; conveyor means operable to continuously feed dry cargo from cargo holds of said carrier to said pipe line means for entrainment in the conveying liquid for delivery to, and separation at, said shore based reservoir; and pump means operable to circulate said conveying liquid through said pipe line means at a relatively high pressure and velocity.

4. A cargo handling arrangement, for double bottom bulk carriers of dry cargo, such as ores, coal, etc., comprising, in combination, pipe line means on the carrier within the double bottom in communication with the cargo holds thereof and having terminals accessible from the exterior of the carrier; a shore based reservoir of relatively heavy conveying liquid, comprising fresh water having fine particles of magnetite and the like suspended therein; a liquid supply line and a liquid return line communicating with said reservoir and having terminals at a carrier anchorage; cargo separating means in said return line in advance of said reservoir; disengageable coupling means operable to couple said supply and return line terminals to respective terminals of said pipe line means, when the carrier is at said anchorage, to circulate conveying liquid through said pipe line means; conveyor means operable to continuously feed dry cargo from cargo holds of said carrier to said pipe line means for entrainment in the conveying liquid for delivery to, and separation at, said shore based reservoir; and pump means operable to circulate said conveying liquid through said pipe line means at a relatively high pressure and velocity; said pump means being located in said supply line.

5. A cargo handling arrangement, for double bottom bulk carriers of dry cargo, such as ores, coals, etc., comprising, in combination, pipe line means on the carrier within the double bottom thereof and having terminals accessible from the exterior of the carrier; the cargo holds of said carrier having outlets communicating with said pipe line means; a shore based reservoir of relatively heavy conveying liquid, comprising fresh water having fine particles of magnetite and the like suspended therein; a liquid supply line and a liquid return line communicating with said reservoir and having terminals at said carrier anchorage; cargo separating means in said return line in advance of said reservoir; disengageable coupling means operable to couple said supply and return line terminals in respective terminals of said pipe line means, when the carrier is at said anchorage, to circulate said conveying liquid through said pipe line means; and mechanical conveyor means in said cargo holds effective to convey dry cargo to the respective outlets thereof for delivery to said pipe line means for entrainment in said conveying liquid for delivery to, and separation at, said shore based reservoir.

6. A cargo handling arrangement, for double bottom bulk carriers of dry cargo, such as ores, coal, etc., comprising, in combination, pipe line means on the carrier within the double bottom thereof in communication with the cargo holds of the carrier and having terminals accessible from the exterior of the carrier; a shore based reservoir of conveying liquid; a liquid supply line and a liquid return line communicating with said reservoir and having terminals at a carrier anchorage for connecting to respective terminals of said pipe line means, when the carrier is at said anchorage, to circulate conveying liquid under pressure through said pipe line means; cargo separating means in said return line in advance of said reservoir; means for feeding cargo from cargo holds of said carrier to said pipe line means for entrainment in the conveying liquid for delivery to, and separation at, said shore based reservoir; shore based conveying means operatively associated with said liquid supply line and effective to deliver dry cargo thereto for entrainment in the conveying liquid for delivery to the cargo holds of said carrier; and other separating means in the cargo holds of said carrier effective to separate the cargo delivered to the holds from the conveying liquid delivered thereto and to return the conveying liquid to said liquid return line.

7. A cargo handling arrangement, for double bottom bulk carriers of dry cargo, such as ores, coal, etc., comprising, in combination, pipe line means on the carrier within the double bottom thereof in communication with the cargo holds of the carrier and having terminals accessible from the exterior of the carrier; a shore based reservoir of conveying liquid; a liquid supply line and a liquid return line communicating with said reservoir and having terminals at a carrier anchorage for connection to respective terminals of said pipe line means, when the carrier is at said anchorage, to circulate conveying liquid under pressure through said pipe line means; cargo separating means in said return line in advance of said reservoir; means for feeding cargo from cargo holds of said carrier to said pipe line means for entrainment in the conveying liquid for delivery to, and separation at, said shore based reservoir; shore based conveying means operatively associated with said liquid supply line and effective to deliver dry cargo thereto for entrainment in the conveying liquid for delivery to the cargo holds of said carrier; other separating means in the cargo holds of said carrier effective to separate the cargo delivered to the holds from the conveying liquid delivered thereto and to return the conveying liquid to said liquid return line; and pump means operable to circulate the conveying liquid through said pipe line means at a relatively high pressure and a relatively high velocity.

8. A cargo handling arrangement, for double bottom bulk carriers of dry cargo, such as ores, coal, etc., comprising, in combination, pipe line means on the carrier within the double bottom thereof in communication with the cargo holds of the carrier and having terminals accessible from the exterior of the carrier; a shore based reservoir of conveying liquid; a liquid supply line and a liquid return line communicating with said reservoir and having terminals at a carrier anchorage for connection to respective terminals of said pipe line means, when the carrier is at said anchorage, to circulate conveying liquid under pressure through said pipe line means; cargo separating means in said return line in advance of said reservoir; means for feeding cargo from cargo holds of said carrier to said pipe line means for entrainment in the conveying liquid for delivery to, and separation at, said shore based reservoir; shore based conveying means operatively associated with said liquid supply line and effective to deliver dry cargo thereto for entrainment in the conveying liquid for delivery to the cargo holds of said carrier; other separating means in the cargo holds of said carrier effective to separate the cargo delivered to the holds from conveying liquid delivered thereto and to return the conveying liquid to said liquid return line; and pump means operable to circulate the conveying liquid through said pipe line means at a relatively high pressure and a relatively high velocity; said pump means being positioned in said liquid supply line.

9. A cargo handling arrangement, for double bottom bulk carriers of dry cargo, such as ores, coal, etc., comprising, in combination, pipe line means on the carrier within the double bottom thereof in communication with the cargo holds of the carrier and having terminals accessible from the exterior of the carrier; a shore based reservoir of conveying liquid; a liquid supply line and a liquid return line communicating with said reservoir and having terminals at a carrier anchorage for connection to respective terminals of said pipe line means, when the carrier is at said anchorage, to circulate conveying liquid under pressure through said pipe line means; cargo separating means in said return line in advance of said reservoir; means for feeding cargo from cargo holds of said carrier to said pipe line means for entrainment in the conveying liquid for delivery to, and separation at, said shore based reservoir; shore based conveying means operatively associated with said liquid supply line and effective to deliver dry cargo thereto for entrainment in the conveying liquid for delivery to the cargo holds of said carrier; other separating means in the cargo holds of said carrier effective to separate the cargo delivered to the holds from the conveying liquid delivered thereto and to return the conveying liquid to said liquid return line; and pump means operable to circulate the conveying liquid through said pipe line means at a relatively high pressure and a relatively high velocity; said pump means being positioned in said pipe line means.

10. A cargo handling arrangement, for double bottom bulk carriers of dry cargo, such as ores, coal, etc., comprising, in combination, pipe line means on the carrier within the double bottom thereof in communication with the cargo holds of the carrier and having terminals accessible from the exterior of the carrier; a shore based reservoir of conveying liquid; a liquid supply line and a liquid return line communicating with said reservoir and having terminals at a carrier anchorage for connection to respective terminals of said pipe line means, when the carrier is at said anchorage, to circulate conveying liquid under pressure through said pipe line means; cargo separating means in said return line in advance of said reservoir; means for feeding cargo from cargo holds of said carrier to said pipe line means for entrainment in the conveying liquid for delivery to, and separation at, said shore based reservoir; shore based conveying means operatively associated with said liquid supply line and effective to deliver dry cargo thereto for entrainment in the conveying liquid for delivery to the cargo holds of said carrier; other separating means in the cargo holds of said carrier effective to separate the cargo delivered to the holds from the conveying liquid delivered thereto and to return the conveying liquid to said liquid return line; first pump means connected in said supply line for circulating said conveying liquid at relatively high pressure and relative high velocity through said pipe line means; and second pump means on the carrier operable to withdraw liquid from said pipe line means through a cargo hold, to entrain cargo in the liquid, and to deliver the liquid with the cargo entrained therein back to said pipe line means.

11. A bulk carrier for the water-borne transportation of dry cargo, such as ores, coal, etc., comprising, in combination, a double bottom hull; plural cargo holds arranged longitudinally of said hull, each cargo hold having a hopper-shaped bottom wall forming one of the double walls of the hull, the hopper-shaped bottom wall of each cargo hold communicating with a respective bottom outlet; pipe line means within the double bottom in communication with the outlets of the cargo holds and having terminals accessible from the exterior of the carrier; said terminals being constructed and arranged for connection to a source of relatively heavy conveying liquid, comprising fresh water having fine particles of magnetite and the like suspended therein, under pressure and to a conveying liquid return line, respectively, for circulation of the conveying liquid through said pipe line means; and conveying means associated with each cargo hold and arranged to discharge dry cargo therefrom through the respective outlet into said pipe line means for entrainment in the conveying liquid for transport thereby.

12. A bulk carrier for water-borne transportation of dry cargo, such as ores, coal, etc., comprising, in combination, a double bottom hull; plural cargo holds arranged longitudinally of said hull, each cargo hold having a hopper-shaped bottom wall forming one of the double walls of the hull, the hopper-shaped bottom wall of each cargo hold communicating with a respective bottom outlet; pipe line means within the double bottom in communication with the outlets of the cargo holds and having terminals accessible from the exterior of the carrier; said terminals being constructed and arranged for connection to a source of relatively heavy conveying liquid, comprising fresh water having fine particles of magnetite and the like suspended therein, under pressure and to a conveying liquid return line, respectively, for circulation of the conveying liquid through said pipe line means; and conveyor means associated with each cargo hold and arranged to discharge dry cargo therefrom through the respective outlet into said pipe line means for entrainment in the conveying liquid for transport thereby; said cargo holds being provided with hatchways only large enough for loading of said cargo holds and of insufficient size for mechanical unloading thereof.

13. A bulk carrier for the water-borne transportation of dry cargo, such as ores, coal, etc., comprising, in combination, a double bottom hull; plural cargo holds arranged longitudinally of said hull, each cargo hold having a hopper-shaped bottom wall forming one of the double walls of the hull, the hopper-shaped bottom wall of each cargo hold communicating with a respective bottom outlet; pipe line means within the double bottom in communication with the outlets of the cargo holds and having terminals accessible from the exterior of the carrier; said terminals being constructed and arranged for connection to a source of conveying liquid under pressure and to a conveying liquid return line, respectively, for circulation of the conveying liquid through said pipe line means; respective receiving tanks each having an inlet connected to the outlet of a respective cargo hold and an outlet connected to said pipe line means; first valve means controlling flow of cargo from each cargo hold outlet to the inlet of the associated receiving tank; second valve means controlling flow of cargo from each receiving tank to said pipe line means; means operable to open said first valve means, while said second valve means is closed, to discharge cargo from a cargo hold into the respective receiving tank; and means operable, when the cargo in the respective receiving tank attains a predetermined level, to close said first valve means and open said second valve means to discharge cargo from said respective receiving tank into said pipe line means for entrainment in the conveying liquid therein for transport thereby.

14. A bulk carrier for the water-borne transportation of dry cargo, such as ores, coal, etc., comprising, in combination, a double bottom hull; plural cargo holds arranged longitudinally of said hull, each cargo hold having a hopper-shaped bottom wall forming one of the double walls of the hull, the hopper-shaped bottom wall of each cargo hold communicating with a respective bottom outlet; pipe line means within the double bottom in communication with the outlets of the cargo holds and having terminals accessible from the exterior of the carrier; said terminals being constructed and arranged for connection to a source of conveying liquid under pressure and to a conveying liquid return line, respectively, for circulation of the conveying liquid through said pipe line means; respective receiving tanks each having an inlet connected to the outlet of a respective cargo hold and an outlet connected to said pipe line means; first valve means controlling flow of cargo from each cargo hold outlet to the inlet of the associated receiving tank; second valve means controlling flow of cargo from each receiving tank to said pipe line means; means operable to open said first valve means, while said second valve means is closed, to discharge cargo from a cargo into the respective receiving tank; and means operable, when the cargo in the respective receiving tank attains a predetermined level, to close said first valve means and open said second valve means to discharge cargo from said respective receiving tank into said pipe line means for entrainment in the conveying liquid therein for transport thereby; a first mechanical conveyor associated with each cargo hold and arranged to move cargo therein to the outlet thereof; and a second mechanical conveyor associated with each receiving tank and arranged to move cargo therefrom into said pipe line means.

15. A bulk carrier for the water-borne transportation of dry cargo, such as ores, coal, etc., comprising, in combination, a double bottom hull; plural cargo holds arranged longitudinally of said hull, each cargo hold having a hopper bottom constituting one wall of said double bottom and communicating with a respective outlet; conveying liquid supply pipe line means positioned within said double bottom and communicating with each of said cargo holds, said conveying liquid supply pipe line means having a terminal, accessible from the exterior of said carrier, constructed and arranged for connection to a source of conveying liquid under pressure; cargo conveying pipe line means positioned within said double bottom and communicating with each of said cargo holds, said cargo conveying pipe line means having a terminal, accessible from the exterior of said carrier, constructed and arranged for connection to a conveying liquid return line; plural tanks, each communicating with the outlet of a respective cargo hold and each connected to said conveying liquid supply pipe line means to receive conveying liquid from the latter; pump means operatively associated with each cargo hold and effective to pump conveying liquid from the associated tank to the cargo conveying pipe line means; and means selectively operable to discharge cargo from each cargo hold into the conveying liquid entering said pump means for entrainment in the conveying liquid for transport to said cargo conveying pipe line means.

16. A bulk carrier for the water-borne transportation of dry cargo, such as ores, coal, etc., comprising, in combination, a double bottom hull; plural cargo holds arranged longitudinally of said hull, each cargo hold having a hopper bottom consisting one wall of said double bottom and communicating with a respective outlet; conveying liquid supply pipe line means positioned within said double bottom and communicating with each of said cargo holds, said conveying liquid supply pipe line means having a terminal, accessible from the exterior of said carrier, constructed and arranged for connection to a source of conveying liquid under pressure; cargo conveying pipe line means positioned within said double bottom and communicating with each of said cargo holds, said cargo conveying pipe line means having a terminal, accessible from the exterior of said carrier, constructed and arranged for connection to a conveying liquid return line; plural tanks, each communicating with the outlet of a respective cargo hold and each connected to said conveying liquid supply pipe line means to receive conveying liquid from the latter; pump means operatively associated with each cargo hold and effective to pump conveying liquid from the associated tank to the cargo conveying pipe line means; a partition dividing each tank into an upper tank portion and a lower tank portion, said partition sloping from one side of each tank to the other side thereof and being apertured, the apertures being of a size insufficient for passage of cargo therethrough; the lower portion of each tank being connected to said conveying liquid supply pipe line means; a line extending from each lower tank portion through the upper tank portion to inlet of the respective pump means for supply of conveying liquid to the respective pump means; a mechanical conveyor extending along the upper surface of each partition adjacent the lower end thereof and having an outlet connected to the respective last-named line for moving cargo thereinto for delivery to said pump means.

17. A bulk carrier for the water-borne transportation of dry cargo, such as ores, coal, etc., comprising, in combination, a double bottom hull; plural cargo holds arranged longitudinally of said hull, each cargo hold having a hopper bottom constituting one wall of said double bottom and communicating with a respective outlet; conveying liquid supply pipe line means positioned within said double bottom and communicating with each of said cargo holds, said conveying liquid supply pipe line means having a terminal, accessible from the exterior of said carrier, constructed and arranged for connection to a source of conveying liquid under pressure; cargo conveying pipe line means positioned within said double bottom and communicating with each of said cargo holds, said cargo conveying pipe line means having a terminal, accessible from the exterior of said carrier, constructed and arranged for connection to a conveying liquid return line; plural tanks, each communicating with the outlet of a respective cargo hold and each connected to said conveying liquid supply pipe line means to receive conveying liquid from the latter; pump means operatively associated with each cargo hold and effective to pump conveying liquid from the associated tank to the cargo conveying pipe line means; a partition dividing each tank into an upper tank portion and a lower tank portion, said partition sloping from one side of each tank to the other side thereof and being apertured, the apertures being of a size insufficient for passage of cargo therethrough; the lower portion of each tank being connected to said conveying liquid supply line means; a line extending from each lower tank portion through the upper tank portion to the inlet of the respective pump means for supply of conveying liquid to the respective pump means; a mechanical conveyor extending along the upper surface of each partition adjacent the lower end therenamed line for moving cargo thereinto for delivery to said pump means; means selectively operable to connect said conveying liquid supply pipe line means to the upper portion of a cargo hold for delivery of cargo, entrained in the conveying liquid in said supply pipe line means, into the respective cargo hold; the conveying liquid flowing through the apertures in said partition to enter said pump means with the cargo being retained on the respective partition; whereby said cargo holds may be loaded with dry cargo through said supply line means.

18. A bulk carrier for the water-borne transportation of dry cargo, such as ores, coal etc., comprising, in combination, a double bottom hull; plural cargo holds arranged longitudinally of said hull, each cargo hold having a hopper bottom constituting one wall of said double bottom and communicating with each of said cargo holds, conveying liquid supply pipe line means having a terminal, accessible from the exterior of said carrier, constructed and arranged for connection to a source of conveying liquid under pressure; cargo conveying pipe line means positioned within said double bottom and communicating with each of said cargo holds, said cargo conveying pipe line means having a terminal, accessible from the exterior of said carrier, constructed and arranged for connection to a conveying liquid return line; plural tanks, each communicating with the outlet of a respective cargo hold and each connected to said conveying liquid supply pipe line means to receive conveying liquid from the latter; pump means operatively associated with each cargo hold and effective to pump conveying liquid from the associated tank to the cargo conveying pipe line means; a partition dividing each tank into an upper tank portion and a lower tank portion, said partition sloping from one side of each tank to the other side thereof and being apertured, the apertures being of a size insufficient for passage of cargo therethrough; the lower portion of each tank being connected to said conveying liquid supply line means; a line extending from each lower tank portion through the upper tank portion to the inlet of the respective pump means for supply of conveying liquid to the respective pump means; a mechanical conveyor extending along the upper surface of each partition adjacent the lower end thereof and having an outlet connected to the respective last-named line for moving cargo thereinto for delivery to said pump means; means selectively operable to connect said conveying liquid supply pipe line means to the upper portion of a cargo hold for delivery of cargo, entrained in the conveying liquid in said supply pipe line means, into the respective cargo hold; the conveying liquid flowing through the apertures in said partition to enter said pump means with the cargo being retained on the respective partition; whereby said cargo holds may be loaded with dry cargo through said supply line means; each cargo hold having, adjacent a side wall thereof, an upright partition defining with such side wall a passage communicating with the lower portion of the associated tank; said partition being perforated with apertures of a size sufficient to provide for flow of liquid therethrough but insufficient to provide for passage of cargo therethrough, whereby liquid retained on top of cargo deposited in the respective cargo hold may flow off to the associated tank.

19. A method of unloading cargo from bulk carriers of dry cargo, such as ores, coal, etc., said method comprising the steps of: providing pipe line means on the bulk carrier in communication with the lower portions of each of the holes thereof and having terminals accessible from the exterior of the carrier; providing a shore based reservoir of relatively heavy conveying liquid comprising fresh water having fine particles of magnetite and the like suspended therein; providing a liquid supply line and a liquid return line extending from the reservoir to a terminal anchorage; connecting the liquid supply line to one end of the pipe line means on a carrier moored at the anchorage and connecting the liquid return line to the other end of the pipe line means; circulating the conveying liquid at a relatively high pressure and a relatively high velocity through the pipe line means of the moored carrier; continuously discharging cargo from holds of the carrier into the pipe line means for entrainment in the conveying liquid for flow through the liquid return line; and separating the entrained cargo from the conveying liquid in advance of returning the conveying liquid to the reservoir.

20. A method of unloading cargo from bulk carriers of dry cargo, such as ores, coal, etc., said method comprising the steps of: providing pipe line means on the bulk carrier in communication with the lower portions of each of the holds thereof and having terminals accessible from the exterior of the carrier; providing a shore based reservoir of conveying liquid; providing a liquid supply line and a liquid return line extending from the reservoir to a terminal anchorage; connecting the liquid supply line to one end of the pipe line means on a carrier moored at the anchorage and connecting the liquid return line to the other end of a pipe line means; circulating conveying liquid at a relatively high pressure and a relatively high velocity through the pipe line means of the moored carrier; continuously discharging cargo from holds of the carrier into the pipe line means for entrainment in the conveying liquid for flow through the liquid return line; separating the entrained cargo from the conveying liquid in advance of returning the conveying liquid to the reservoir; during loading of the carrier moored at the anchorage, charging dry cargo into the liquid supply line for delivery to the pipe line means; discharging liquid and cargo into the holds of the carrier; and returning the liquid to the pipe line means while retaining the discharged cargo in the holds.

References Cited by the Examiner

UNITED STATES PATENTS

| | | | |
|---|---|---|---|
| 1,127,137 | 2/1915 | West | 214—15 |
| 1,374,068 | 4/1921 | Dunn | 302—14 |
| 1,564,805 | 12/1925 | West | 214—15 |
| 2,573,907 | 11/1951 | Humphreys | 214—15 X |
| 2,793,082 | 5/1957 | Gardner | 302—14 |
| 3,104,020 | 9/1963 | Klapp | 214—17 |

MILTON BUCHLER, *Primary Examiner.*

T. M. BLIX, *Assistant Examiner.*